United States Patent
Wood et al.

[11] 4,082,323
[45] Apr. 4, 1978

[54] BOX HOLE DRILL STEEL

[75] Inventors: Edgar Wray Wood; Jerry Olympus Young, both of Midland, Tex.

[73] Assignee: Smith International, Inc., Midland, Tex.

[21] Appl. No.: 721,828

[22] Filed: Sep. 9, 1976

[51] Int. Cl.² .............................................. F16L 39/00
[52] U.S. Cl. ................................ 285/133 A; 285/302; 285/348; 285/333
[58] Field of Search ...................... 285/47, 133 A, 142, 285/133 R, 143, 333, 138, 140, 334, 348, 355, 351, 302; 138/113, 114; 166/85, 88; 175/215

[56] References Cited
U.S. PATENT DOCUMENTS

| 1,140,633 | 5/1915 | Trucano | 285/47 |
| 1,299,441 | 4/1919 | Ennis | 285/138 |
| 2,332,529 | 10/1943 | Reppert | 285/47 X |
| 3,050,124 | 8/1962 | Ottenbacher | 166/88 X |
| 3,510,155 | 5/1970 | Jacobus | 285/351 X |
| 3,860,269 | 1/1975 | Horton et al. | 285/133 R |
| 3,917,319 | 11/1975 | Kloesel, Jr. et al. | 285/334 X |

FOREIGN PATENT DOCUMENTS

| 1,027,685 | 5/1953 | France | 285/351 |
| 2,145,745 | 3/1973 | Germany | 285/47 |

Primary Examiner—Werner H. Schroeder
Assistant Examiner—Moshe I. Cohen
Attorney, Agent, or Firm—Murray Robinson; Ned L. Conley; David Alan Rose

[57] ABSTRACT

According to the invention, there is provided a box hole drill steel with a replaceable water pipe coaxially mounted therein by elastomeric support means.

6 Claims, 8 Drawing Figures

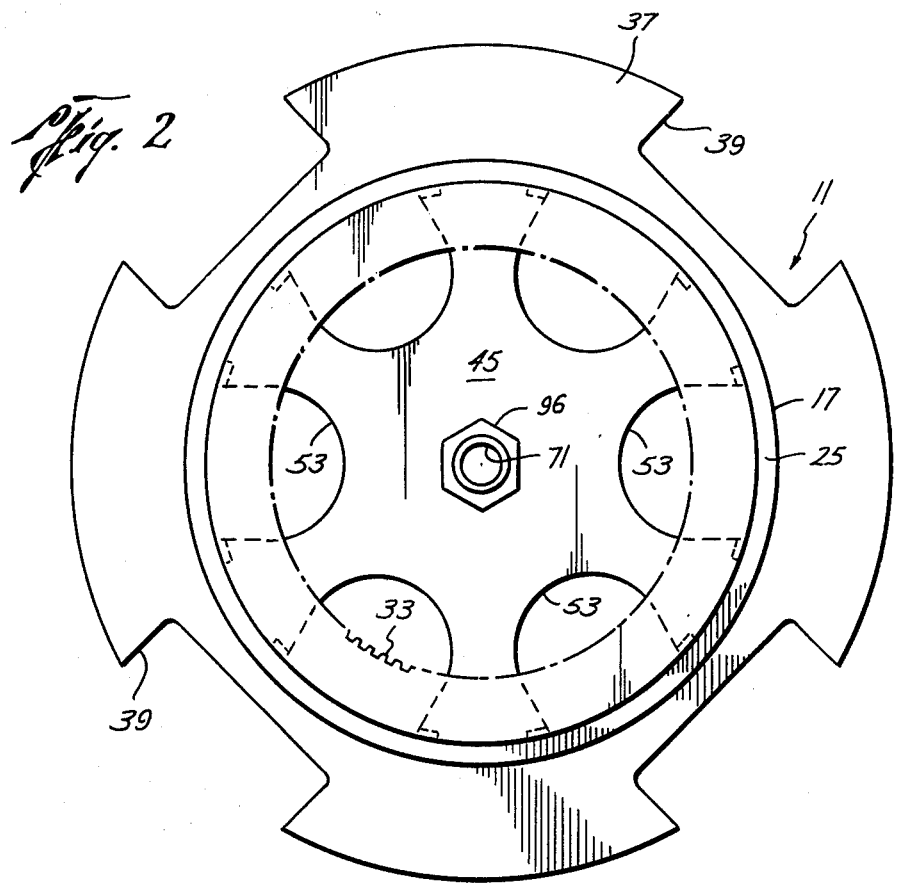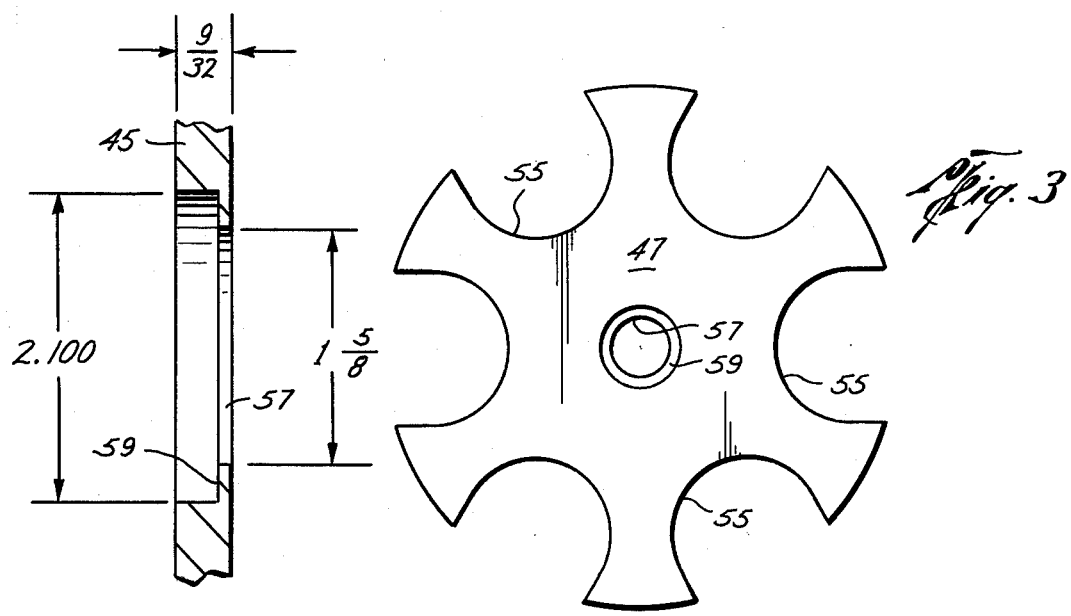

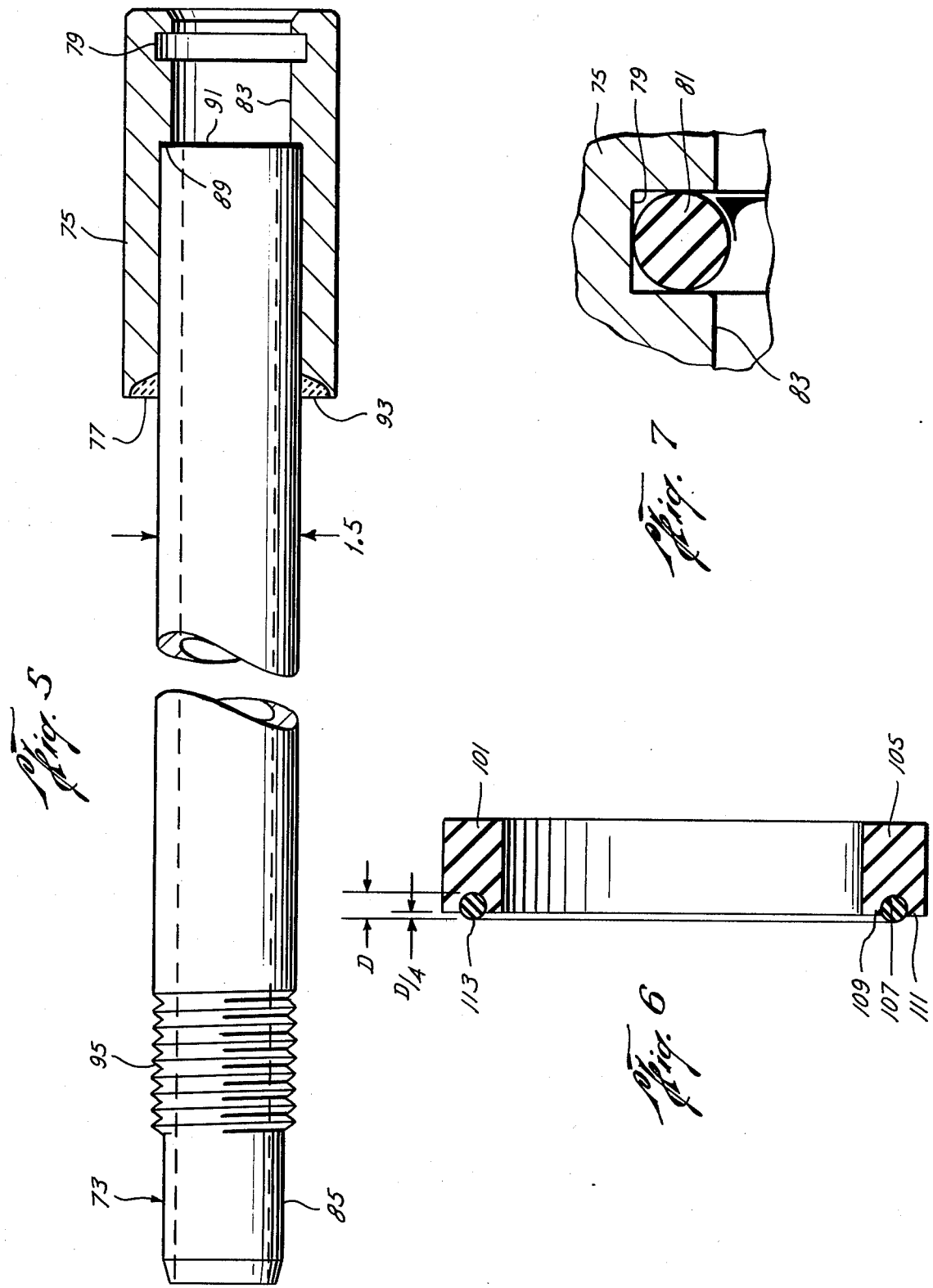

BOX HOLE DRILL STEEL

BACKGROUND OF THE INVENTION

This invention relates to box hole drill steel.

Box hole drill steel and a method of its use is disclosed in U.S. Pat. No. 3,917,321.

Dual tube drill pipe with the inner tube elastomer mounted in the outer tube has heretofore been used, e.g. in drilling vertical holes for support posts, and is disclosed in the U.S. Pat. No. 4,067,596, by Jackson M. Kellner and Vincent Hugo Vetter entitled "Dual Flow Passage Drill Stem", assigned to the same assignee as the present invention. Multiple tube drill pipe having an elastomer mounted inner tube and intended primarily for drilling horizontal and near horizontal holes, e.g. for venting methane from coal mines, is disclosed in U.S. Pat. No. 4,040,495, by Jackson M. Kellner and William R. Garrett, entitled "Hydro-Electric Bit Guide", assigned to the same assignee as the present application. Other prior art relevant to multiple pipe and to elastomer mounting of the inner tube thereof is discussed in these two Kellner et al patent applications and should be consulted for further identification of the prior art.

Dust suppression has heretofore been effected in box hole drill steel, e.g. it is understood, by providing each length of box hole steel with a water conduit, probably a rubber hose therein, the hoses being provided at their ends with steel couplings.

Box hole drill steel with dust suppressant water pipe welded solidly in the center thereof and with pin and box O-ring sealed telescopic joints at the ends of the pipe has heretofore been made.

Box hole drill steel with flanges for handling the steel and splines for making a driving connection with the drill steel may be the subject of a pending application assigned to the same assignee as the present invention by inventors employed by another division of the assignee.

Double lip elastomer seal rings with O-ring spreaders, all of the same construction as used herein for support rings, are known as Parker rod seals.

Dual tube drill pipe, with an elastomer shock absorber and telescopic, elastomer sealed connection means for the inner tube thereof are disclosed in U.S. Pat. Nos. 4,012,061 by Wallace F. Olson and 3,998,479 by William W. Bishop, both assigned to the same assignee as the present application, and considerable prior art relating thereto is made of record therein.

SUMMARY OF THE INVENTION

According to the invention there is provided box hole drill steel with replaceable water pipe coaxially mounted therein by elastomeric support means.

Dual tube box hole drill steel comprises an outer tubular member having a thick wall, e.g. the wall has a thickness in excess of ten percent of the inner radius of the tubular member. The tubular member has a short length, i.e. its length is of the same order of magnitude as its outer circumference e.g. one yard. Concentrically mounted within the outer tubular member is an inner pipe for dust suppresant water. The inner pipe has an outer diameter of a different order of magnitude than that of the outer tubular member, the inner pipe's outer diameter being smaller, e.g. 10 percent of that of the tubular member.

A holding flange is provided around the tubular member near one end, and the flange is provided with wrench slots. At the same one end of the tubular member it is provided with an internal spline for making a driving connection with a drill. A male threaded connection means is integral with one end of the tubular member and a female threaded connection means is welded to the other end thereof.

Spiders welded against shoulders in the connection means support the pipe coaxially within the tubular member. The pipe has a telescopic joint pin integral with one end disposed within said male connection means in the tubular member. The pipe has an O-ring sealed telescopic joint box integral with the other end disposed within said female connection means in the tubular member. There is a shoulder formed where the box joint is welded to the pipe. A nut threaded onto the pin joint forms another shoulder. Between said shoulders and rabbets at the inner peripheries of the spiders, the latter fitting only loosely around the pipe, are expansible double lip elastomer rings. An O-ring within each elastomer ring lies between the axially facing lips thereof. The O-rings are harder than the elastomer rings. Make up of the nut compresses the O-rings into the elastomer rings, wedging the inner rubber lips radially into contact with the pipe to provide radial support and pressing the elastomer rings against the spiders to provide axial support for the pipe. Washers between shoulders on the one side and the O-rings and double lips of the elastomer rings on the other side, provide stationary smooth surfaces for contact with the rings during tightening of the nut.

The elastomer mounting of the pipe permits the pipe to move radially and accommodate for misalignment of the pipe in one piece of drill steel when connected to the pipe in another piece of drill steel, thereby to insure that a proper seal is effected between the pin and an O-ring in the box. Such misalignment being a particular problem with dual tube drill stem of the box hole type due to the shortness of the steel and to the disparity between the diameters of the outer tube and inner pipe. In addition the elastomer mounting serves as a shock absorber to reduce vibratory and other stresses transferred from the outer tubular member to the pipe. Finally, the mounting method makes it possible easily to replace the water pipe.

BRIEF DESCRIPTION OF THE DRAWINGS

For a detailed description of a preferred embodiment of the invention, reference will now be made to the accompanying drawings wherein:

FIG. 2 is an elevation of the pin end of the drill steel shown in FIG. 1A;

FIG. 3 is an elevation of the spider at the box and of the drill steel shown in FIG. 1B;

FIG. 4 is a fragmentary axial section through the spiders shown in FIG. 1A, and is a mirror image of a like section through the spider shown in FIG. 3;

FIG. 5 is an elevation partly in section, of the central pipe of the drill steel shown in FIGS. 1A and 1B;

FIG. 6 is an axial section to a larger scale of the elastomer support means shown in FIG. 1A, and is a mirror image of a like section through the elastomer support means shown in FIG. 1B; and FIG. 7 is a fragmentary axial section, to a larger scale, of the seal box of the drill steel shown in FIG. 1B, with the O-ring seal in contact with the sides of the box groove as it actually is, as distinct from the spaced apart showing in FIG. 1B.

DESCRIPTION OF PREFERRED EMBODIMENT

Figure 1A:
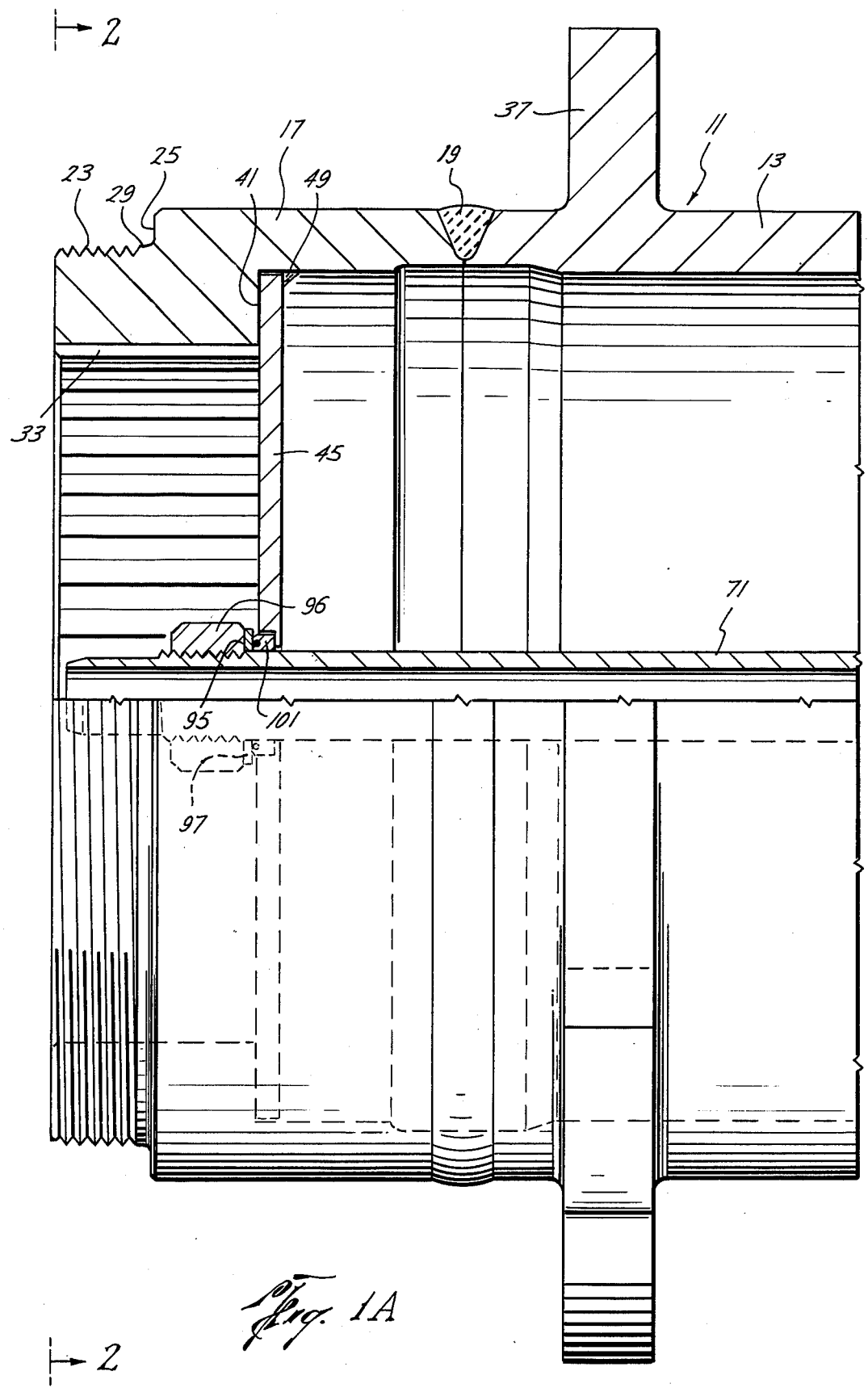
FIGS. 1A and 1B together form an axial section through a length of drill steel embodying the invention.
Figure 1B:
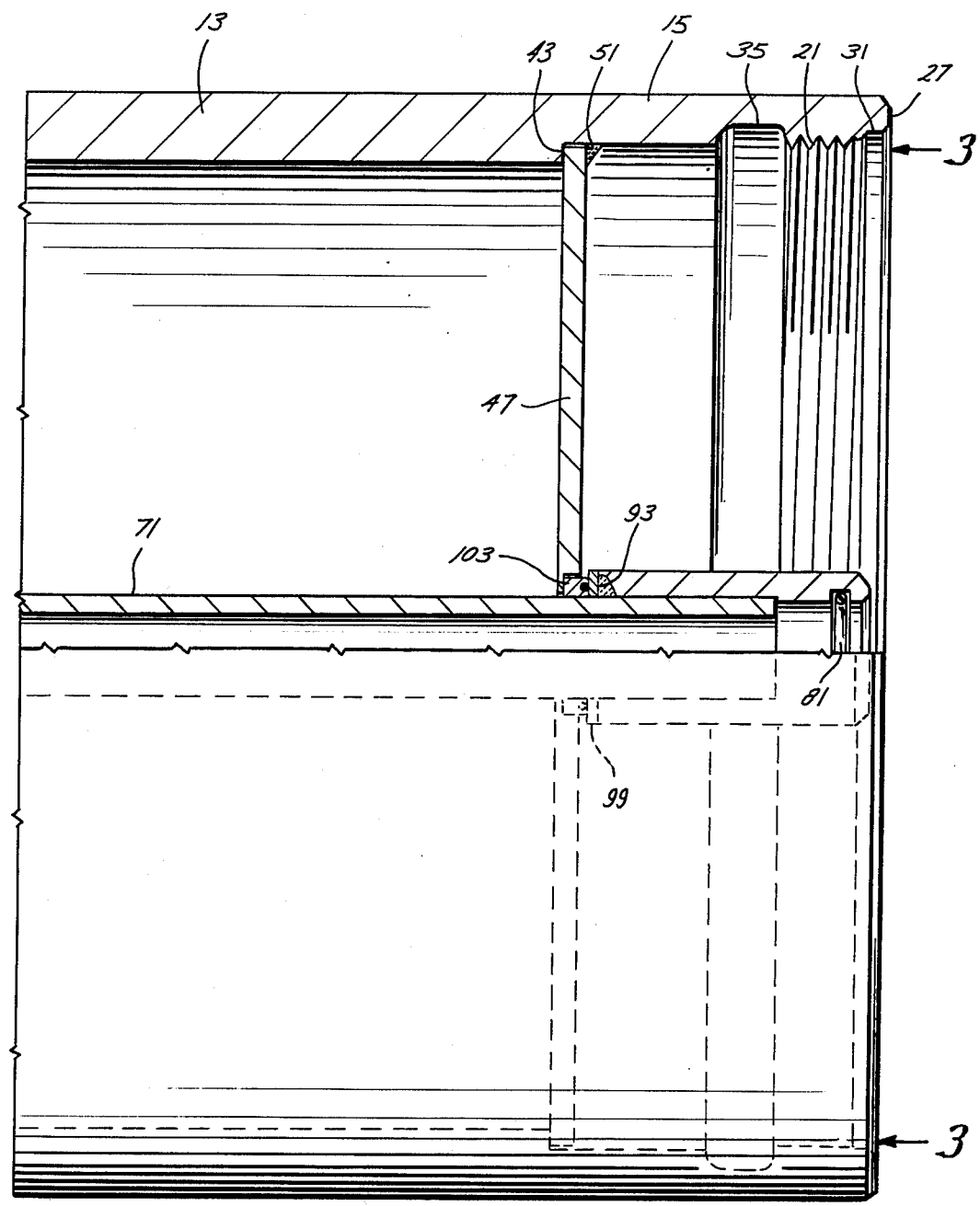

Referring now to FIGS. 1A and 1B, there is shown a length of drill steel including an outer tubular member 11 comprising a tubular body 13 having a female threaded connection means 15 formed integrally therewith at one end and having a male threaded connection means 17 welded thereto at the other end. The weld is indicated at 19. The female threads are shown at 21 and the male threads at 23. The threaded connection means 15, 17 are correlative, each being adapted to make up with the opposite end of another length of like drill steel or with correlative means on a drill bit or drill. A shoulder 25 on the male connection means 17 is adapted to engage a shoulder provided by the end of the box on another length of drill steel like shoulder 27 on female connection means 15. There are unthreaded areas 29, 31 between the threads and shoulders, to be strained during make-up, thereby to form rotary shouldered connections. U.S. Pat. No. 3,754,609 — Garrett gives a further discussion of rotary shouldered connections. A suitable straight thread form is shown in U.S. Pat. No. 3,917,321 to Rodgers.

The male connection means 17 is provided internally with splines 33 for making a driving connection with a drill. The female connection means 15 is provided internally with a relief groove 35. Compare U.S. Pat. No. 2,745,685 to Moore.

Around the exterior of body 13 near the male connection means 17 is a flange 37. As shown in FIG. 2, flange 37 is provided with a plurality of slots 39 for receiving a make-up and break-out wrench. Flange 37 also serves to support the drill steel during additions and subtractions of drill steel. In this regard it would be a substitute for the holding tubes shown in the aforementioned U.S. Pat. No. 3,917,319 to Kloesel et al.

Referring again to FIGS. 1A and 1B, there are annular shoulders 41, 43 on the interior of tubular member 11 adjacent the ends thereof, one being formed adjacent male connection means 17 and the other being formed adjacent female connection means 15. Both of these shoulders face the female connection means end of the drill steel. Adjacent these shoulders are disposed two spiders 45, 47 (See also FIGS. 2, 3 and 4). The siders are welded in place, e.g. by a plurality of arcuate beads of weld metal 49, 51.

The spiders are scalloped at their outer peripheries as indicated at 53, 55. However if desired the spiders could be blank, i.e. without any openings around the periphery or elsewhere, except centrally to receive the water pipe as will be described later. There is no flow of fluid required through the spiders since in box hole drilling the cuttings return by gravity outside of the drill steel. On the other hand, cutting away portions of the spiders does make the interior of the drill steel visible and also lessens the weight of the drill steel. Since the term spider would be inapt for describing a washer, the term support plate may be used in the appended claims.

Each spider or support plate is provided with a central opening, as best shown at 57 in FIG. 4. There is a rabbet 59 around the opening at one side thereof. The spiders are positioned so that the rabbets face the adjacent ends of the drill steel.

Referring once more to FIGS. 1A, 1B, and 2, extending the length of the drill steel coaxially within the outer tubular member 11 is a pipe 71. Pipe 71 is used to carry water or other dust suppressant to the drill bit. Pipe 71 extends through openings 57 in the spiders, with some clearance. As shown in FIG. 5, the outer diameter of pipe 71 is 1.5 inches (All the dimensions on the drawing are in inches unless otherwise indicated). As shown in FIG. 4, the diameter of the openings 57 is 1⅝ inches. The elastomer support means hereinafter described support pipe 71 within the openings 57 in the support plates or spiders 45, 47.

Referring now particularly to FIG. 5, pipe 71 is provided at one end with a telescopic joint pin 73, formed integrally therewith, and is provided at the other end with a telescopic joint box 75, welded thereto at 77. The box 75 is formed with an annular groove 79 (see also FIG. 7). An O-ring 81 is disposed in the groove, as shown best in FIG. 7 and also in FIG. 1B. O-ring 81 is preferably made of an elastomer, e.g. rubber or neoprene. O-ring 81 fits snugly between the sides of groove 79 but protrudes slightly inwardly therefrom. The inner diameter of box 75 at 83 is only slightly larger than the outer diameter of the pin at 85. The inner diameter of O-ring 81 is slightly smaller than the outer diameter of the pin at 85. With this arrangement, the box 75 can receive the pin 73 on the end of another like length of drill steel or other correlative member and the O-ring 81 will deform and seal therewith. Box 75 may therefore be referred to sometimes as a seal box.

The seal box 75 is bored out to provide a positioning shoulder 89. The seal box is pushed onto pipe 71 until shoulder 89 abuts the end 91 of the unfinished pipe; the seal box is then welded in place. By such accurate positioning there is assurance that when the connection means on the outer tubular members of two or more lengths of the drill steel, or other members with correlatively formed telescopic joint means, are made up together, the ends of the telescopic pins will not bottom in the boxes prior to full make up of the connection means on the outer tubular members. Preferably, there will be a slight axial gap between the pin ends (and shoulders) and the box bottoms (and shoulders) of each telescopic joint when the rotary shouldered connections are fully made up.

The weldment 77 securing the seal box to the rest of pipe 71 is machined off to form a smooth shoulder 93 to cooperate with the elastomer support means at the box end of pipe 71, as will be described hereinafter. At the other end of the pipe 71, adjacent pin 73, the pipe is provided with a straight thread 95, to receive nut 96 (see FIG. 1A). Nut 96 provides an adjustable surface or shoulder 99 to cooperate with the elastomer support means at the pin end of pipe 71, as will be described hereinafter.

Referring to FIGS. 1A and 1B, adjacent to shoulders 93, 95 are disposed flat steel washers 97, 99, disposed around pipe 71. Between each washer and the rabbet 59 of the adjacent spider is disposed an annular elastomeric support means. Such elastomeric support means are shown at 101, 103, and a typical one of such elastomeric support means is shown at 101 in FIG. 6 (means 103 faces the opposite direction but is otherwise identical).

Referring to FIG. 6, each support means 101, 103, comprises an annular body 105 of an elastomer, such as rubber or neoprene, which may have a durometer hardness of 60 to 70, for example, on the Shore A scale. Body 105 is provided with an annular groove 107, of arcuate cross section, forming two lips 109, 111. Within groove 107 is disposed O-ring 113 made of an elastomer such as rubber or neoprene but having a greater hardness, for example, a durometer hardness of 80 on the Shore A scale. Identical structure intended to be used as a seal ring is commercially available under the name "Parker #18701500-375 rod seal" and further description may be obtained from said manufacturer.

When pipe 71 is assembled inside tubular member 11, being threaded through the openings 57 in the spiders, and nut 96 is screwed onto the pipe, the elastomer support means 101, 103 are compressed between the spider rabbets and the washers. The washers, which lie against the O-rings 113, press the O-rings into the softer body rings 105 and wedge the inner lips 109 to move inward into engagement with the tube 71. By this means the tube 71 is both axially and radially elastomerically supported.

The elastomeric support serves to dampen vibrations which might otherwise be transmitted from the outer tubular member to the inner tubular member. In addition, the support means is such that the inner pipe is readily removable from the outer tubular member as may be required for replacement or repair.

Primarily, however, the elastomeric support allows the pipe to shift a certain amount e.g. radially to compensate for misalignment between the pipe in one piece of box hole drill steel and the next. Such misalignment is difficult to avoid with such short members as box hole drill steel and with such a disparity in diameter between the outer tubular member and the pipe therewithin as exists with box hole steel and its dust suppressor pipe. In this regard it will be noted that the pipe has an outer diameter of the order of only 10 percent of that of the outer tube; considering orders of magnitutde to the usual base ten, the outer diameter of the pipe is not only smaller than that of the outer tubular member but is of a different order of magnitude therefrom. At the same time the length of the outer tubular member is of the same order of magnitude as the outer circumference thereof, both being around a yard, more or less. Considering the matter quantitatively a non-concentricity of the pipe of only one percent of the outer diameter of the outer tubular member amounts to ten percent of the outer diameter of the pipe. A non-concentricity of the inner pipe of one-tenth of an inch will produce an angle of cant ten times as great for a member three feet long as for one 30 feet long.

Although the invention has been illustrated in an embodiment in which elastomeric support means is provided at both ends, it will be apparent that some of the advantages of the invention can be had if such means is used at only one place, e.g. at one end of the steel, the pipe being provided with unyielding rigid supports at the other end or elsewhere as against radial or axial movement or both. At this juncture it should be pointed out that loading of the pipe support means due to change of length of the outer tubular member relative to the inner pipe is not a problem in box hole steel because the outer tubular member is so thick, i.e. over ten percent of the inner radius of the outer tubular member, that the strain thereon under expected load conditions is relatively small.

The O-rings of the elastomeric support means cooperating with the washers and shoulders on the pipe, are just one example of wedging means that can be employed to force the rubber of the annular elastomer support means against the pipe. However, they are a particularly simple and effective wedging means, making it unnecessary to provide conical camming surfaces on the washers or shoulders.

While a preferred embodiment of the invention has been illustrated and described and various modifications thereof discussed, other modifications can be made by one skilled in the art without departing from the spirit of the invention.

We claim:

1. Dual tube box drill steel comprising:
   an outer tubular metal member having connection means at each end for making connection with like steel;
   said outer tubular member having a wall thickness of at least ten percent of its inner radius,
   said outer tubular member having and outer circumference of the same order of magnitude as its length,
   an inner metal pipe having telescopic joint means at each end for making connection with like steel,
   said pipe having an outer diameter which is of a different order of magnitude than that of said tubular member, the pipe being smaller, and
   support means positioning said pipe with its length extending lengthwise of the outer tubular member and with the midpoint of the pipe within said outer tubular member, said support means tending to prevent relative axial motion of the pipe and said tubular member,
   said support means including elastomeric means tending to position the pipe radially relative to said tubular member to be coaxial therewith but allowing radial movement of the pipe relative to the outer tubular member to compensate for misalignment of the pipe's telescopic joint means with the telescopic joint means on the pipes of adjacent lengths of steel when the latter are made up with the first said steel.

2. Steel according to claim 1, said elastomeric means comprising:
   (a) an annular elastomer ring,
   (b) means carried by said outer tubular member providing radial support for said ring against radial outward motion and providing axial support for said ring against axial motion in one direction, and
   (c) wedging means receiving axial thrust in said one direction from said inner pipe and exerting radially inward pressure on said ring forcing it into engagement with the outer periphery of said inner pipe.

3. Steel according to claim 2,
   said support means including two of said elastomeric means disposed adjacent opposite ends of said pipe with said means (b) thereof supporting the rings (a) thereof against axial motion in opposite directions and said wedging means (c) thereof receiving axial thrust from said inner pipe in opposite axial directions.

4. Steel according to claim 3,
   said elastomer rings (a) each having an annular groove at one side thereof,
   said wedging means (c) each including an O-ring of harder material than said elastomeric ring, engaged with said groove of the respective elastomer ring.

5. Drill steel according to claim 4,
   said wedging means (c) each further including:
   (d) a shoulder connected to said inner pipe, and
   (e) a washer between said shoulder and said O-ring.

6. Drill steel according to claim 5
   one of said shoulders of said wedging means being formed by the connection means at one end of said pipe, the other of said shoulders of said wedging means being formed by a nut screwed onto the other end of said pipe, passing over the connection means thereat, said pipe being free to turn in said outer tubular member except as limited by frictional engagement of said elastomer rings therewith.

* * * * *

UNITED STATES PATENT AND TRADEMARK OFFICE
CERTIFICATE OF CORRECTION

PATENT NO. : 4,082,323
DATED : April 4, 1978
INVENTOR(S) : Edgar Wray Wood and Jerry Olympus Young It is certified that error appears in the above—identified patent and that said Letters Patent is hereby corrected as shown below:

Column 3, line 46: change "siders" to -spiders-.
Column 6, line 7: after "box", insert -hole-.

Column 5, line 32: change "magnitutde" to -magnitude-.
Column 6, line 13: change "and" to -an-.

*Signed and Sealed this*

*Seventh* Day of *October 1980*

[SEAL]

Attest:

SIDNEY A. DIAMOND

Attesting Officer    Commissioner of Patents and Trademarks